US009635258B2

United States Patent
Ikeda

(10) Patent No.: US 9,635,258 B2
(45) Date of Patent: Apr. 25, 2017

(54) IMAGE PICKUP APPARATUS, METHOD OF CONTROLLING IMAGE PICKUP APPARATUS, IMAGE PROCESSING APPARATUS, AND IMAGE PROCESSING METHOD

(71) Applicant: CANON KABUSHIKI KAISHA, Tokyo (JP)

(72) Inventor: Shunichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/965,113

(22) Filed: Dec. 10, 2015

(65) Prior Publication Data

US 2016/0182828 A1    Jun. 23, 2016

(30) Foreign Application Priority Data

Dec. 22, 2014 (JP) ................................ 2014-259083

(51) Int. Cl.
*H04N 5/232* (2006.01)
*H04N 5/353* (2011.01)

(52) U.S. Cl.
CPC ..... *H04N 5/23264* (2013.01); *H04N 5/23245* (2013.01); *H04N 5/23258* (2013.01); *H04N 5/23287* (2013.01); *H04N 5/3532* (2013.01)

(58) Field of Classification Search
CPC ........... H04N 5/23264; H04N 5/23267; H04N 5/2328; H04N 5/23248; H04N 5/23274; H04N 5/23287; H04N 5/23245; H04N 5/23258; H04N 5/3532; G02B 27/646
USPC .......................................... 348/208.4, 208.5
See application file for complete search history.

(56) References Cited

U.S. PATENT DOCUMENTS

| 5,982,421 A * | 11/1999 | Inou | H04N 5/23248 348/208.5 |
| 8,681,229 B2 * | 3/2014 | Nomura | G03B 5/00 348/208.1 |
| 2008/0037970 A1 * | 2/2008 | Saito | G03B 5/00 396/55 |
| 2008/0175574 A1 * | 7/2008 | Tomita | H04N 5/23212 396/55 |
| 2011/0157381 A1 * | 6/2011 | Miyasako | G02B 27/646 348/208.5 |

(Continued)

FOREIGN PATENT DOCUMENTS

JP    2803072 B    9/1998
JP    2010-004370 A    1/2010

*Primary Examiner* — Albert Cutler
(74) *Attorney, Agent, or Firm* — Cowan, Liebowitz & Latman, P.C.

(57) ABSTRACT

Provided is an image pickup apparatus, including: a first correction amount calculating unit configured to calculate a first image blur correction amount based on a shake signal representing shake of the image pickup apparatus a second correction amount calculating unit configured to calculate a second image blur correction amount for driving an optical image blur correction unit based on the first image blur correction amount; and a third correction amount calculating unit configured to calculate a third image blur correction amount for driving an electronic image blur correction unit based on the first image blur correction amount and a value representing the position of at least one of a part of the optical system and the image pickup element, the value being detected by a position detector.

8 Claims, 7 Drawing Sheets

(56) References Cited

U.S. PATENT DOCUMENTS

2012/0293672 A1* 11/2012 Nonaka .................... G03B 5/00
  348/208.5
2013/0155262 A1* 6/2013 Katoh ................ H04N 5/23267
  348/208.5

* cited by examiner

IMAGE PICKUP APPARATUS, METHOD OF CONTROLLING IMAGE PICKUP APPARATUS, IMAGE PROCESSING APPARATUS, AND IMAGE PROCESSING METHOD

BACKGROUND OF THE INVENTION

Field of the Invention

The present invention relates to an image pickup apparatus having an image blur correction function, a method of controlling an image pickup apparatus, an image processing apparatus, and an image processing method.

Description of the Related Art

As a technology for detecting shake of an image pickup apparatus resulting from shaking by a photographer, and correcting image blur caused by the shaking, an image blur correction technology for moving an image blur correction lens based on the amount of shaking is known. This type of image blur correction function is referred to as optical image blur correction or optical image stabilization.

Further, there is known an image blur correction function for correcting blur in a taken image during moving image photography by clipping a part of the taken image based on the amount of shaking and outputting the clipped image is known. This type of image blur correction function is referred to as electronic image blur correction or electronic image stabilization.

Further, in recent years, there known a technology for enhancing, during moving image photography, the effect of image blur correction on large image blur produced as a result of taking images while walking and the like by widening an image blur correction range on the wide side (wide angle side) in particular. In this case, there is also known a technology that is capable of obtaining a larger correction effect to deal with larger image blur by using optical image blur correction and electronic image blur correction together.

An example of such a technology of using optical image blur correction and electronic image blur correction together is Japanese Patent Application Laid-Open No. 2010-004370. In Japanese Patent Application Laid-Open No. 2010-004370, there is disclosed a technology for dividing a detected image blur signal into a high-frequency image blur signal and a low-frequency image blur signal by a filter, correcting the high-frequency image blur by optical image blur correction, and correcting the low-frequency image blur by electronic image blur correction. As a result, the control calculations are more efficient, and the correction effect is improved.

Further, in Japanese Patent No. 2803072, there is disclosed a technology for increasing the correction range and improving the correction effect by performing electronic image blur correction when an image blur amount is smaller than a given fixed value, and performing optical image blur correction when the image blur amount is equal to or more than that fixed value.

However, in the above-mentioned optical image blur correction, a mechanical control is carried out on the correction mechanism, such as a lens. Therefore, when the image pickup apparatus including an optical image blur correction unit is subject to strong vibrations due to the user taking images while walking, running, or the like, image blur caused by shake of the optical image blur correction mechanism may occur.

SUMMARY OF THE INVENTION

According to one embodiment of the present invention, there is provided an image processing apparatus configured to correct image blur by controlling a first image blur correction unit configured to perform correction optically by driving at least one of a part of an optical system and an image pickup element in a direction for correcting blur in an object image formed by the optical system, and a second image blur correction unit configured to perform correction electronically by controlling readout position of the image pickup element in a direction for correcting blur in the object image, the image processing apparatus including: a first correction amount calculating unit configured to calculate a first image blur correction amount based on a shake signal detected by a shake detection unit configured, to detect shake of the image pickup apparatus and output a shake signal; a second correction amount calculating unit configured to calculate a second image blur correction amount for driving the first image blur correction unit based on the first image blur correction amount; and a third correction amount calculating unit configured to calculate a third image blur correction amount for driving the second image blur correction unit based on the first image blur correction amount and a value representing a position of the at least one of a part of the optical system and the image pickup element being driven by the first image blur correction unit, the value being detected by a position detector configured to output a value representing the position of the at least one of a part of the optical system and the image pickup element.

According to one embodiment of the present invention, there is provided an image processing method for correcting image blur by controlling a first image blur correction unit configured to perform correction optically by driving at least one of a part of an optical system and an image pickup element in a direction for correcting blur in an object image formed by the optical system, and a second image blur correction unit configured to perform correction electronically by controlling a readout position of the image pickup element in a direction for correcting blur in the object image, the image processing method including: a first correction amount calculating step of calculating a first image blur correction amount based on a shake signal detected by a shake detection unit configured to detect shake of the image pickup apparatus and output a shake signal; a second correction amount calculating step of calculating a second image blur correction amount for driving the first image blur correction unit based on the first image blur correction amount; and a third correction amount calculating step of calculating a third image blur correction amount for driving the second image blur correction unit based on the first image blur correction amount and a value representing a position of the at least one of a part of the optical system and the image pickup element being driven by the first image blur correction unit, the value being detected by a position detector configured to output a value representing the position of the at least one of a part of the optical system and the image pickup element.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
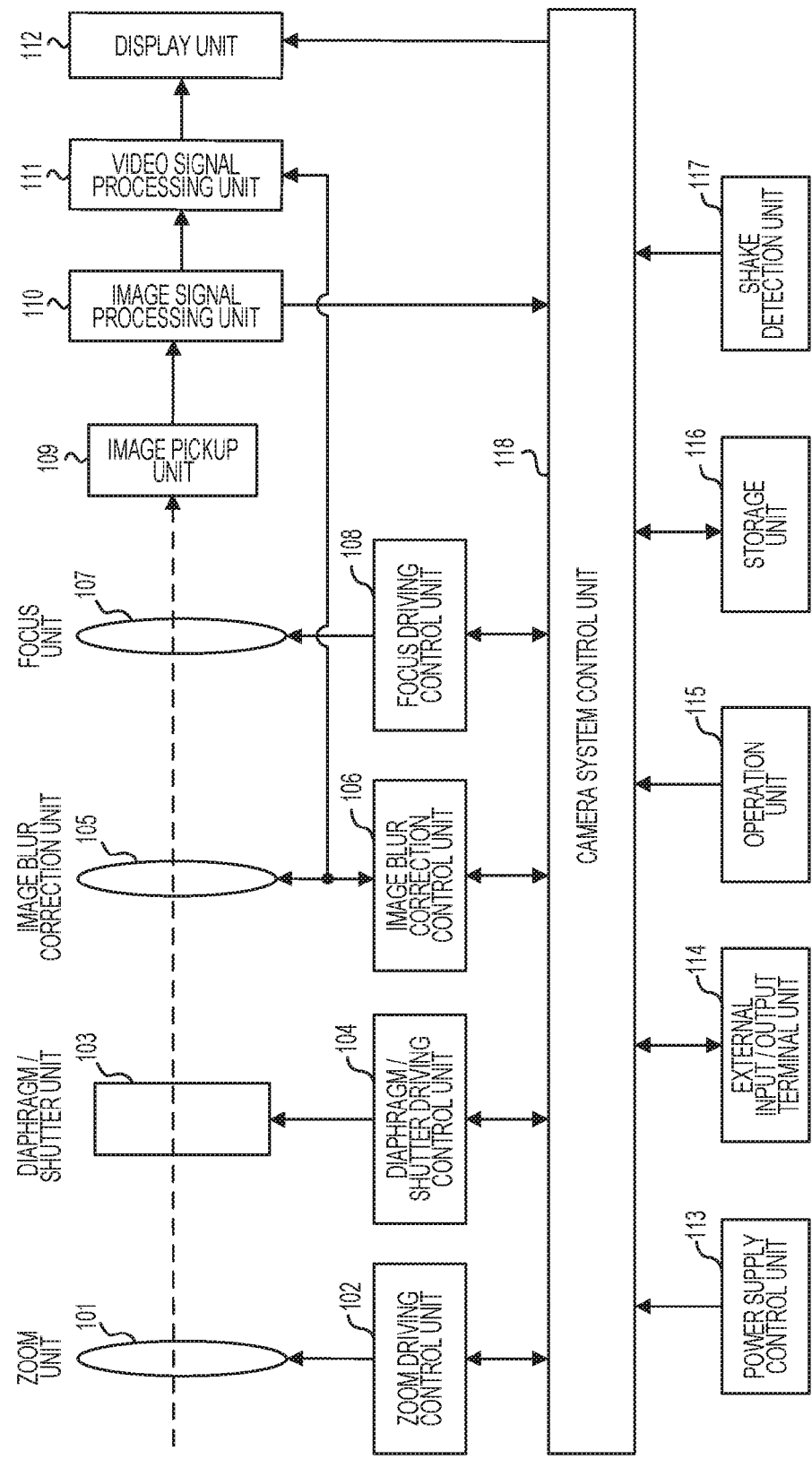
FIG. 1 is a block diagram of an image pickup apparatus according to a first embodiment of the present invention.

FIG. 1 is a block diagram for illustrating a configuration of an image pickup apparatus according to a first embodiment of the present invention. The image pickup apparatus may be a digital camera, a digital single-lens reflex camera, a digital video camera, and the like. In the following exemplary description, the image pickup apparatus is a digital camera capable of taking still images and moving images.

The image pickup apparatus has an optical image blur correction (optical image stabilization) function for optically correcting image blur, and an electronic image blur correction (electronic image stabilization) function for electronically correcting image blur. The image pickup apparatus includes, as an optical system for forming an object image, a zoom unit 101, a diaphragm/shutter unit 103, an image blur correction unit (shift lens) 105, and a focus unit 107. Further, the image pickup apparatus also includes, as control units configured to control those units, a zoom driving control unit 102, a diaphragm/shutter driving control unit 104, an image blur correction control unit 106, and a focus driving control unit 108.

The zoom unit 101 includes a zoom lens for varying magnification (changing the image magnification). The zoom driving control unit 102 controls a drive of the zoom unit 101. The diaphragm/shutter unit 103 has a diaphragm function and a shutter function. The diaphragm/shutter driving control unit 104 controls a drive of the diaphragm/shutter unit 103. The image blur correction unit 105 includes an image blur correction lens capable of changing its position in order to perform optical image blur correction. The image blur correction control unit 106, which is a control unit configured to control optical image blur correction and electronic image blur correction, controls a drive of the image blur correction unit 105. The focus unit 107 includes a focus lens configured to perform focal adjustment. The focus driving control unit 108 controls a drive of the focus unit 107.

The image pickup apparatus further includes an image pickup unit 109, an image signal processing unit 110, a video signal processing unit 111, and a display unit 112. Light entering the image pickup apparatus from an object passes through the zoom unit 101, the diaphragm/shutter unit 103, the image blur correction unit 105, and the focus unit 107, and forms an image on the image pickup unit 109.

The image pickup unit 109 includes an image pickup element configured to convert the object image formed by the light entering from the optical system into an electric signal by photoelectric conversion. The image signal processing unit 110 is configured to convert the electric signal output from the image pickup unit 109 into a video signal. The video signal processing unit 111 is configured to process the video signal output from the image signal processing unit 110 based on an application. As an example of this processing, the video signal processing unit 111 performs processing for changing a clipping position of the video signal based on a correction amount of electronic image blur correction output from the image blur correction control unit 106. The display unit 112 is configured to display an image based on the signal output from the video signal processing unit 111.

The image pickup apparatus further includes a power supply control unit 113, an external input/output terminal unit 114, an operation unit 115, a storage unit 116, a shake detection unit 117, and a camera system control unit 118. The power supply control unit 113 is configured to supply power to the overall system of the image pickup apparatus based on the application. The external input/output terminal unit 114 is configured to input and output a communication signal and a video signal to/from the image pickup apparatus and an external device. The operation unit 115 is an interface that allows the user to operate the image pickup apparatus. The storage unit 116 is a storage medium for storing various data, such as video information. The shake detection unit 117 is a detection device including a sensor configured to detect an amount of shake on the camera. The shake detection unit 117 includes, for example, a gyro sensor (an angular velocity sensor). The camera system control unit 118 is configured to control the overall system of the image pickup apparatus by transmitting and receiving signals to and from each unit, performing various calculations, and the like.

Next, an outline of the operations of the image pickup apparatus having the above-mentioned configuration is described.

The operation unit 115 includes an image blur correction switch that allows image blur correction to be selectively turned ON and OFF. The camera system control unit 118 is configured to issue, when ON of image blur correction is selected by the image blur correction switch, an instruction to the image blur correction control unit 106 to perform an image blur correction operation. The image blur correction control unit 106 receives the instruction, and performs the image blur correction operation until an instruction is issued to turn OFF image blur correction.

Further, the operation unit 115 includes an image blur correction mode selection switch for selecting between a mode for performing image blur correction only by optical image blur correction (first image blur correction), and a mode for performing image blur correction by using optical image blur correction and electronic image blur correction (second image blur correction) together. When the mode for performing image blur correction only by optical image blur correction is selected, clipping of the image in order to perform electronic image blur correction is not carried out, and hence such a mode can be employed for wide angle photography. On the other hand, when the mode for performing image blur correction using optical image blur correction and electronic image blur correction together is selected, the clipping range of the video signal by the video signal processing unit 111 is narrower, and hence the angle of view is narrower. However, this mode provides an electronic image blur correction function that changes the clipping position based on the image blur correction amount, and hence larger image blur can be handled.

The operation unit 115 includes a shutter release button configured such that a switch SW1 and a switch SW2 are turned on in order based on a pressing amount. The switch SW1 is turned on when the shutter release button is pressed about halfway, and the switch SW2 is turned on when the shutter release button is fully pressed. When the switch SW1 is turned on, the focus driving control unit 108 performs focal adjustment by driving the focus unit 107, and the diaphragm/shutter driving control unit 104 sets an appropriate exposure amount by driving the diaphragm/shutter unit 103. When the switch SW2 is turned on, image data obtained from the optical image exposed by the image pickup unit 109 is stored in the storage unit 116.

Further, the operation unit 115 includes a moving image photography switch. When the moving image photography switch is pressed, moving images start to be taken. When the moving image photography switch is pressed again during recording, moving images stop being taken. When the switch SW1 and the switch SW2 of the shutter release button are pressed while moving images are being taken, a still image can be taken while the moving images are being taken. In addition, the operation unit 115 includes a playback mode selection switch for selecting a playback mode of the taken moving images. During the playback mode, the image blur correction operation is stopped.

Still further, the operation unit 115 includes a magnification switch for issuing a zoom magnification instruction. When a zoom magnification instruction is issued by the magnification switch, the instruction is input to the zoom driving control unit 102 via the camera system control unit 118. The zoom driving control unit 102 is configured to move the zoom unit 101 to the instructed zoom position by driving the zoom unit 101. Simultaneously with this, the focus driving control unit 108 performs focal adjustment by driving the focus unit 107 based on the image information that is sent from the image pickup unit 109 to the image signal processing unit 110 and the video signal processing unit 111 to be processed.

Figure 2:
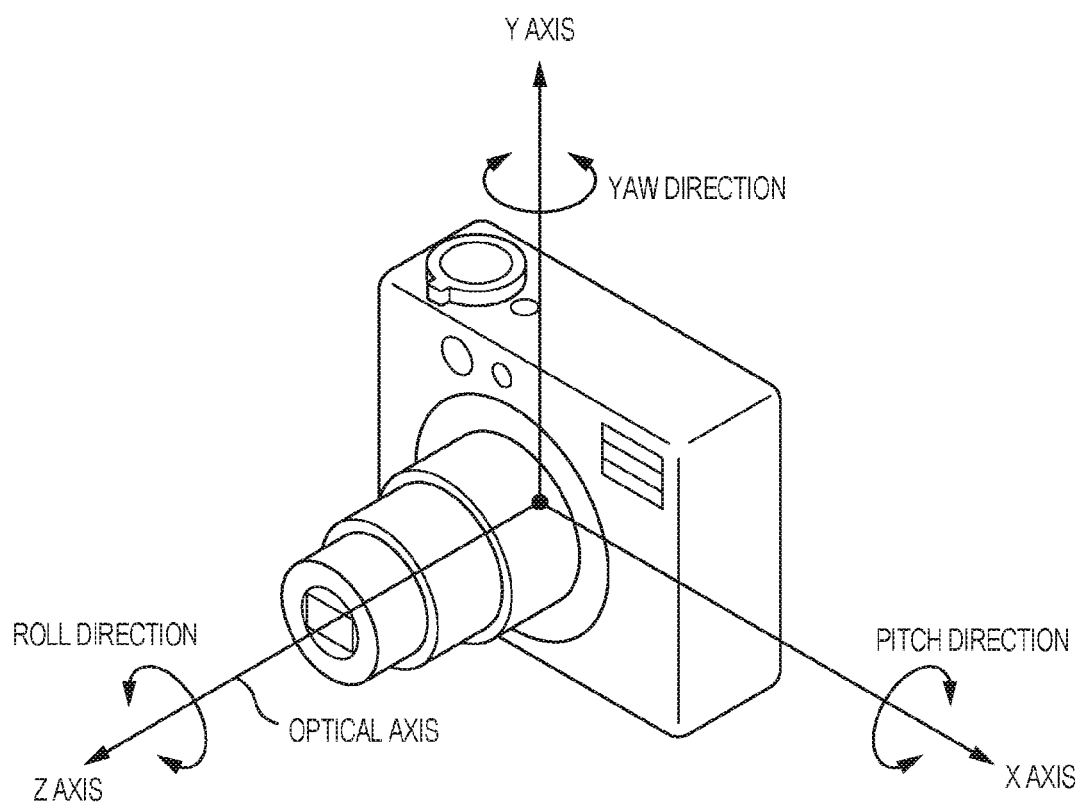
FIG. 2 is a diagram for illustrating a pitch direction, a yaw direction, and a roll direction.

FIG. 2 is a diagram for illustrating a pitch direction, a yaw direction, and a roll direction. The shake detection unit 117 is configured to detect angular velocity data in the pitch direction, yaw direction, and roll direction by using a gyro sensor or the like as a sensor for shake detection, and output a detection result as a voltage. The shake detection unit 117 includes a pitch direction shake detection sensor (not illustrated), a yaw direction shake detection sensor (not illustrated), and a roll direction shake detection sensor (not illustrated).

As illustrated in FIG. 2, the Z axis represents an optical axis, the axis represents the vertical direction in a normal position, and the X axis represents the direction orthogonal to the Y axis and the Z axis. The pitch direction is the direction about the X axis (tilting direction), the yaw direction is the direction about the Y axis (panning direction), and the roll direction is the direction about the Z axis (direction in which the image plane rotates at the plane perpendicular to the optical axis). In other words, the pitch direction is an oblique direction with respect to the horizontal plane in the perpendicular direction of the image pickup apparatus, the yaw direction is an oblique direction with respect to the vertical plane in the horizontal direction of the image pickup apparatus, and the pitch direction and the yaw direction are orthogonal to each other.

The pitch direction shake detection sensor is configured to detect shake information (angular velocity data) based on shake of the image pickup apparatus in the pitch direction. The yaw direction shake detection sensor is configured to detect shake information (angular velocity data) based on shake of the image pickup apparatus in the yaw direction. The roll direction shake detection sensor is configured to detect shake information (angular velocity data) based on shake of the image pickup apparatus in a rotational direction in the plane perpendicular to the optical axis.

Figure 3:
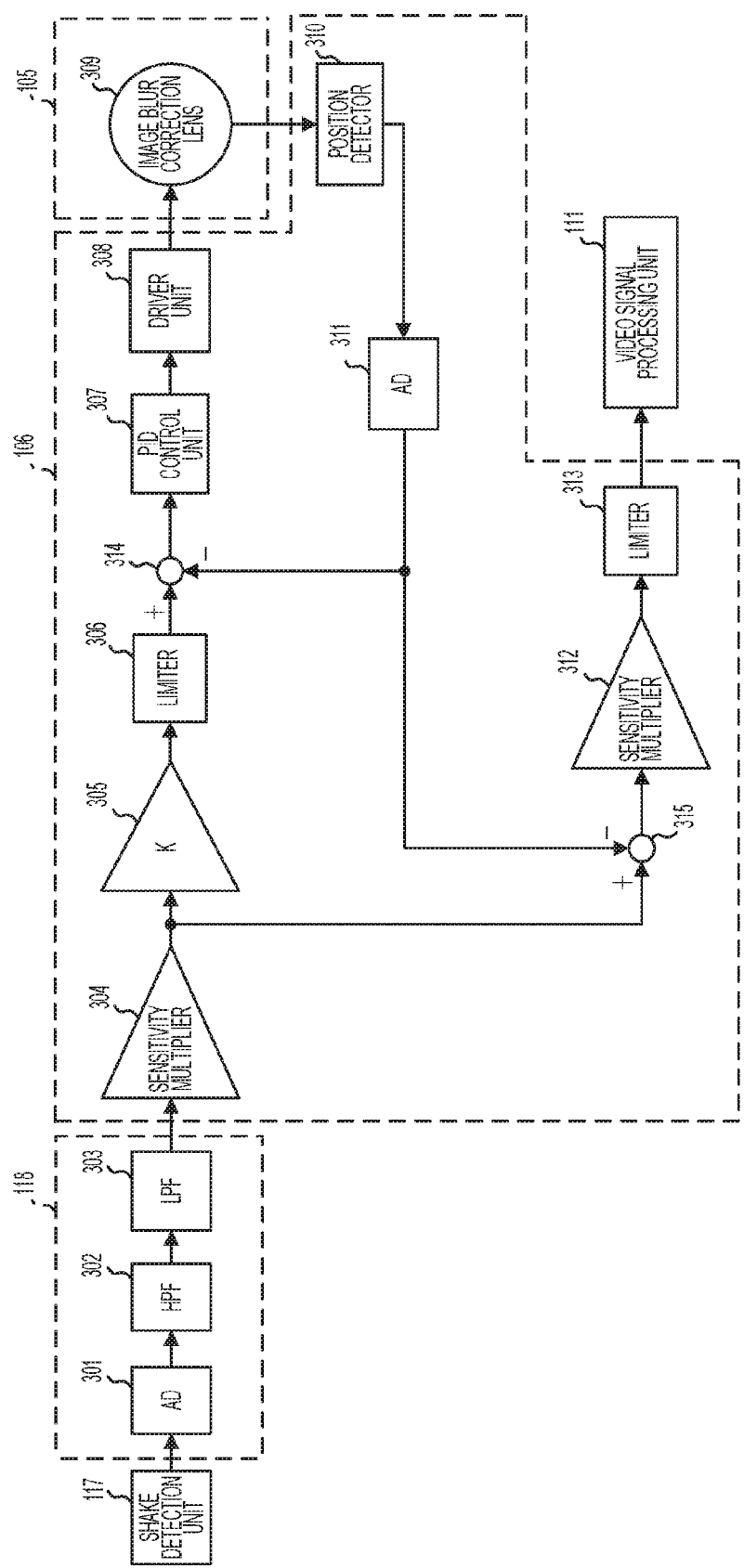
FIG. 3 is a block diagram of an image blur correction control unit according to the first embodiment of the present invention.

FIG. 3 is a block diagram for illustrating in more detail the configuration of the image blur correction control unit 106. In the block diagram illustrated in FIG. 3, an example is illustrated in which the image blur correction control unit 106 is intended to correct image blur caused by rotation in the pitch direction or the yaw direction. An image blur correction control unit 106 is arranged for each rotational axis for which image blur correction is to be performed in the image pickup apparatus. However, in the following description, only one axis in the pitch direction or yaw direction is focused on. The to configuration applies to the other axes as well.

The shake detection unit 117 is configured to detect an angular velocity generated by shake of the image pickup apparatus, and output the detected angular velocity as an analog voltage signal representing the angular velocity to the camera system control unit 118. The camera system control unit 118 includes an analog-to-digital (AD) converter 301, a high-pass filter (HPF) 302, and a low-pass filter (LPF) 303.

The AD converter 301 is configured to convert the analog voltage representing the angular velocity output from the shake detection unit 117 into digital data, and output the digital data to the high-pass filter 302. The high-pass filter 302 is configured, to remove noise, such as gyro sensor offset and temperature drift, contained in the input angular velocity data, and output the resultant angular velocity data to the low-pass filter 303. The low-pass filter 303 is configured to integrate the input angular velocity data, convert the integrated angular velocity data into angle data, and output the converted angle data to the image blur correction control unit 106. Note that, the above-mentioned parts of the camera system control unit 118 are not essential components, and some of the parts may be omitted. Further, those functions may be included in the image blur correction control unit 106 or the shake detection unit 117 instead of the camera system control unit 118.

The image blur correction control unit 106 includes, as blocks for performing calculations, sensitivity multipliers 304 and 312, a correction amount calculating unit 305, correction amount limiters 306 and 313, and subtractors and 315. The image blur correction control unit 106 also includes a proportional-integral-derivative (PID) control unit 307, a driver unit 308, a position detector 310, and an AD converter 311. Further, the image blur correction unit 105 includes an image blur correction lens 309 for correcting image blur. The image blur correction lens 309 is configured to be shifted above a plane perpendicular to the optical axis under the control of the driver unit 308. As a result, the incident light is refracted, and image blur is corrected.

The sensitivity multiplier (correction amount calculating unit) 304 is configured to convert the angle data input from the camera system control unit 118 into an image blur correction amount by multiplying the angle data by a sensitivity. The sensitivity, which is a conversion coefficient for the conversion, varies based on the focal length of the image pickup apparatus. As a result, the sensitivity is different for each focal length of the image pickup apparatus.

The correction amount calculating unit 305 is configured to multiply the image blur correction amount output from the sensitivity multiplier 304 by a coefficient K in order to calculate an image blur correction amount for optical image blur correction. The coefficient K is determined as follows based on a movable range A of optical image blur correction and a movable range B of electronic image blur correction at each focal length.

$$K=A/(A+B) \quad (1)$$

As a result, the ratio of the correction amount to be corrected by optical image blur correction with respect to the overall amount of image blur correction is calculated as the coefficient K. Note that, based on Expression (1), K is a value of 1 or less.

The correction amount limiter 306 is configured to clamp the correction amount of optical image blur correction so as not to exceed the movable range A, and output the clamped correction amount to the subtractor (correction amount calculating unit) 314. As a result, the lens can be prevented from hitting the end of the movable range of optical image blur correction. The output data of the correction amount limiter 306 represents a target position used when the image blur correction lens 309 is shifted in order to perform optical image blur correction. The processing carried out by the subtractor 314 is described later.

The PID control unit 307 is configured to output a signal for controlling the position of the lens to the driver unit 308 based on data input from the subtractor 314. The driver unit 308 is configured to supply a drive current to the image blur correction lens 309 based on the signal output from the PID control unit 307. The position detector 310 is configured to detect the position of the image blur correction lens 309, and output the detected position as an analog voltage signal. The AD converter 311 is configured to convert the analog voltage representing the position of the image blur correction lens 309 output from the position detector 310 into a digital value. The output value of the AD converter 311 is input to the subtractor 314. The subtractor 314 is configured to subtract a value representing the position (current position) of the image blur correction lens 309 from the value of the output (target position) of the correction amount limiter 306, and output the resultant value to the PID control unit 307. As a result of the operations carried out as described above, optical image blur correction is performed.

Next, electronic image blur correction described. When the user of the image pickup apparatus takes images while walking, running, or the like, the image pickup apparatus is subject to a large acceleration. The acceleration is transmitted to the image blur correction lens 309, causing image blur to be produced in the output still image or moving images. The image pickup apparatus according to this embodiment is configured to reduce such image blur by performing electronic image blur correction.

The image blur correction amount output from the sensitivity multiplier 304 and the value representing the position of the image blur correction lens 309 output from the AD converter 311 are input to the subtractor 315. The subtractor 315 configured to subtract the value representing the position of the image blur correction lens 309 from the image blur correction amount input from the sensitivity multiplier 304. The subtraction result is input to the sensitivity multiplier 312. The sensitivity multiplier 312 is configured to convert the input data into a correction pixel amount of electronic image blur correction. The correction amount limiter 313 is configured to clamp the correction amount of electronic image blur correction so as not to exceed the movable range B, and output the clamped correction amount to the video signal processing unit 111. The video signal processing unit 111 is configured to perform electronic image blur correction based on the output data.

In the electronic image blur correction performed according to the processing described above, the value representing the position of the image blur correction lens 309 is used for calculation of the correction amount, and hence the effects of image blur caused by shake of the image blur correction lens 309 are reduced. As a result, an image pickup apparatus can be provided that is capable of taking images having little image blur even when the image pickup apparatus is subject to strong vibrations due to the user of the image pickup apparatus taking images while walking, running, or the like.

Figure 4:
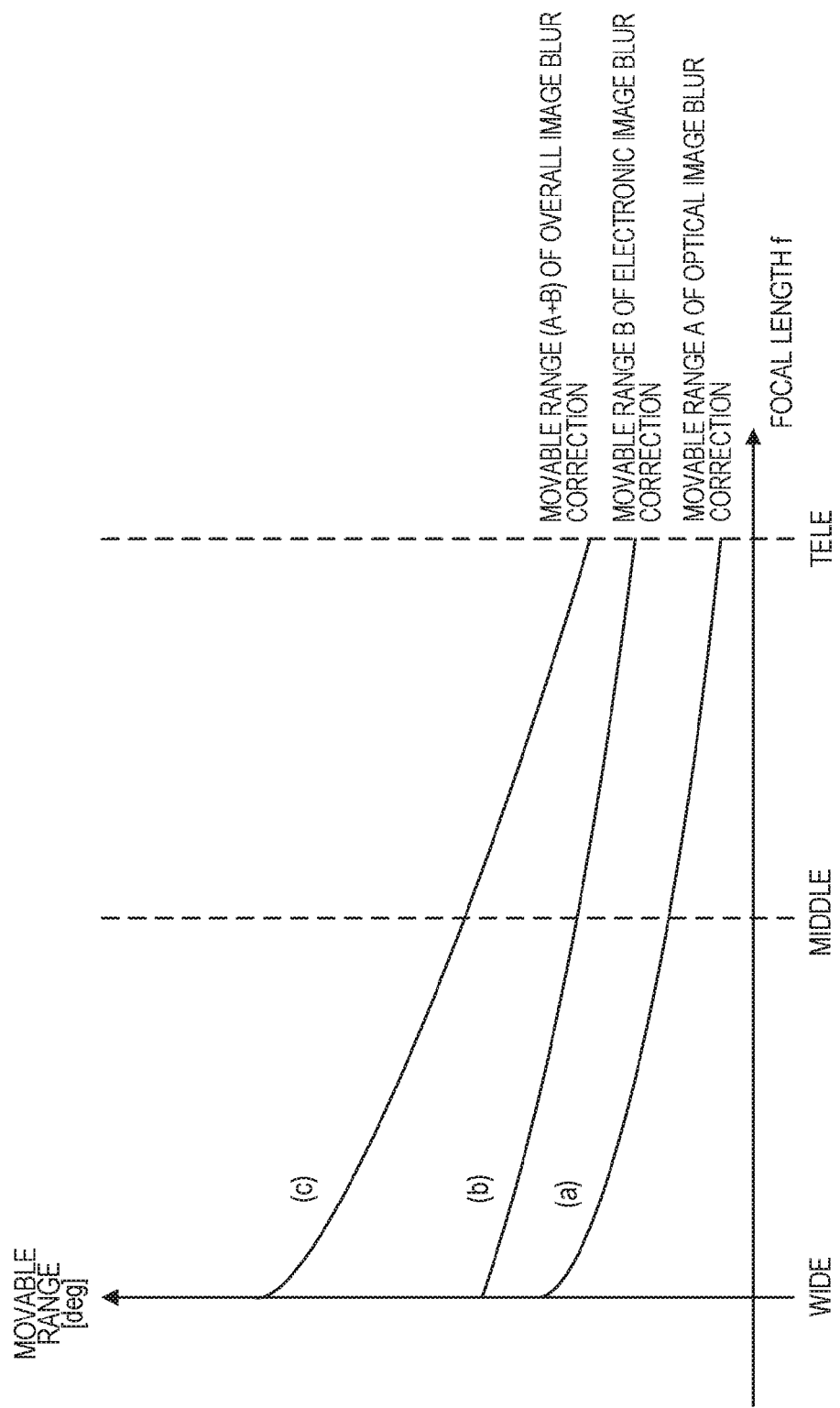
FIG. 4 is a graph for illustrating a relationship between a focal length and an image blur correction range.

FIG. 4 is a graph for illustrating a relationship between a focal length of the camera and a movable range of image blur correction. In FIG. 4, the horizontal axis represents the focal length of the camera, and the vertical axis represents the movable range of image blur correction. Line (a) represents the movable range A of optical image blur correction, line (b) represents the movable range B of electronic image blur correction, and line (c) represents the movable range (A+B) of overall image blur correction. In other words, lines (a), (b), and (c) have a relationship in which (a)+(b)=(c).

The movable range A of optical image blur correction is determined based on the optical properties of the lens. The movable range B of electronic image blur correction is determined based on the surplus pixels of the image pickup element. Note that, the correction angle (degree of deviation from the optical axis for correcting movement of the image caused by shaking) for both the movable range A of optical image blur correction and the movable range B of electronic image blur correction changes depending on the optical zoom magnification, focal length, and the like.

In other words, even when the same shaking is applied on the camera, the craving amount of the image blur correction unit 105 that is necessary for correcting the image blur caused by camera shake is different depending on the zoom position (optical zoom magnification and focal length). For example, even when the same 1 [deg] of shake is applied on the camera, the movement amount of the image blur correction unit 105 in order to correct the image blur caused by this 1 [deg] of shaking is smaller at a wide end (wide angle end) than at a tele end (telephoto end).

Figure 5:
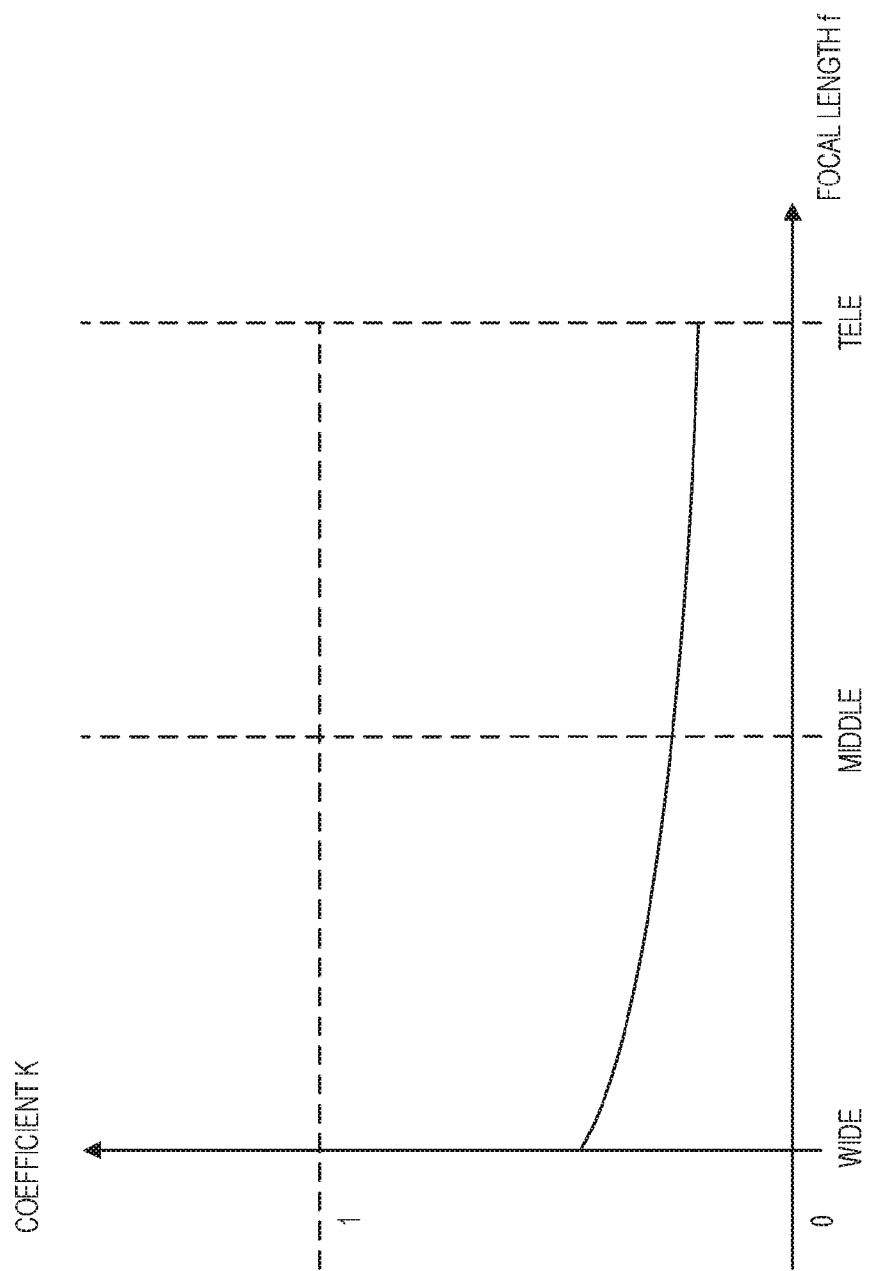
FIG. 5 is a graph for illustrating a relationship between the focal length and a coefficient K.

FIG. 5 is a graph for illustrating a relationship between a focal length and a coefficient K. As described above, the coefficient K is determined based on the movable range A of optical image blur correction and the movable range B electronic image blur correction. Specific examples are now described for the cases where the camera is at the three points as illustrated in FIG. 4, a wide end, a middle position, and a tele end. The image blur corresponding to the movable range A+B of overall image blur correction can be corrected by operating the image blur correction unit 105 within the movable range A of optical image blur correction and the movable range B of electronic image blur correction.

In this case, the movable range A of optical image blur correction is set at 2 [deg] for the wide end, 0.75 [deg] for the middle position, and 0.3 [deg] for the tele end. Further, the movable range B of electronic image blur correction is set at 2.5 [deg] for the wide end, 1.6 [deg] for the middle position, and 1.1 [deg] for the tele end. In such a case, based on Expression (1), the coefficient N is calculated as 0.444 for the wide end, 0.319 for the middle position, and 0.214 for the tele end.

In a correction method such as that in Japanese Patent No. 2803072, which uses any one of optical image blur correction and electronic image blur correction based on the amount of image blur, at the boundary between the two correction ranges, image defects may occur due to overshooting and the like as a result of the optical image blur correction operation. In contrast, in this embodiment, the movable ranges are expanded by simultaneously performing both an optical image blur correction operation and an electronic image blur correction operation, and hence there is no boundary between the movable ranges in optical image blur correction and electronic image blur correction. As a result, image defects caused by overshooting in optical image blur correction are reduced.

Thus, the mode for performing image blur correction only by optical image blur correction and the mode for performing image blur correction by using optical image blur correction and electronic image blur correction together can also be selected by the operation unit 115. A method of switching the mode is now described.

A case is considered in which optical image blur correction and electronic image blur correction are used together. In this case, for optical image blur correction, the correction amount of optical image blur correction is determined by multiplying, by the correction amount calculating unit 305, the overall amount of image blur correction by the coefficient $K=A/(A+B)$. For electronic image blur correction, the clipping position of the image is determined based on a correction amount obtained by subtracting the value representing the position of the image blur correction lens 309 detected by the position detector 310 from the overall amount of image blur correction.

On the other hand, in the case of correcting only by optical image blur correction, the coefficient K of the image blur correction amount of optical image blur correction is taken to be 1. In other words, the coefficient K is switched so that the overall amount of image blur correction matches the correction amount of optical image blur correction. At this stage, the movable range B of electronic image blur correction is clamped at 0 by the correction amount limiter 313. As a result, the correction amount of electronic image blur correction is switched to 0, and electronic image blur correction is not carried out.

Next, the operation carried out when taking a still image during moving image photography in which optical image blur correction and electronic image blur correction are used together is described. When the switch SW2 is pressed and the image pickup apparatus enters a mode for taking still images, the correction amount calculating unit 305 sets the coefficient K to 1. Further, during still image photography, electronic image blur correction is not carried out, and hence the correction amount of electronic image blur correction is switched to 0 by clamping the movable range B of electronic image blur correction by the correction amount limiter 313. In other words, the image blur correction amount is switched in the same manner as in the mode for correcting only by optical image blur correction.

When still image exposure is finished, the correction amount calculating unit 305 switches the coefficient K to $K=A/(A+B)$, and the correction amount limiter 313 switches the movable range B of electronic image blur correction from 0 to the original value. Thus, the image pickup apparatus according to this embodiment is capable of taking a still image during moving image photography in which optical image blur correction and electronic image blur correction are used together.

In an image pickup apparatus configured to correct high-frequency image blur by optical image blur correction and low-frequency image blur by electronic image blur correction such as that disclosed in Japanese Patent Application Laid-Open No. 2010-004370, in the case of taking a still image during moving image photography, it may be difficult to perform low-frequency image blur correction. In contrast, in this embodiment, optical image blur correction and electronic image blur correction are not separated based on frequency, and hence such a problem is solved or reduced. Further, in this embodiment, a filter for separating the frequency is not required, and hence the calculation load and program capacity are lower than for the configuration disclosed in Japanese Patent Application. Laid-Open No. 2010-004370.

Note that, at the switch carried, out when starting still image photography and when finishing still image photography, the output may be gradually changed over a predetermined output time in order to decrease noise produced by the correction amounts of optical image blur correction and electronic image blur correction suddenly fluctuating.

Second Embodiment

Next, an image pickup apparatus employing a rolling shutter method is described as a second embodiment of the present invention.

As the exposure method employed when taking images by an image pickup apparatus such as a digital camera, a global shutter method and a rolling shutter method are used. In an apparatus employing a global shutter method represented by a charge coupled device (CCD) sensor, for a single frame image, the exposure time of the pixels and the exposure start time of the pixels are substantially the same. On the other hand, in an image pickup apparatus including a complementary metal-oxide-semiconductor (CMOS) sensor, a rolling shutter method is employed as the exposure method.

A rolling shutter method is a method in which the exposure timing is different at each pixel line. In this exposure method, image distortion caused by a deviation in the exposure timing and readout time of each line (hereinafter referred to as "rolling shutter distortion") may occur. When different positional deviation occurs at each line due to shake of the image pickup apparatus, rolling shutter distortion may occur. Even if the apparatus is mounted on a tripod or the like, rolling shutter distortion may occur when vibrations are applied to the apparatus due to a disturbance such as the wind. As a result, for an image pickup apparatus employing a rolling shutter method, rolling shutter distortion may be a problem.

As described above, rolling shutter distortion occurs in a taken image due to the exposure timing being different at each pixel line. Therefore, the distortion produced in the image may be corrected by using as the correction amount the movement amount of each pixel line obtained based on a shake signal detected by the image pickup apparatus. A method of correcting rolling shutter distortion according to this embodiment is now described.

Figure 6:
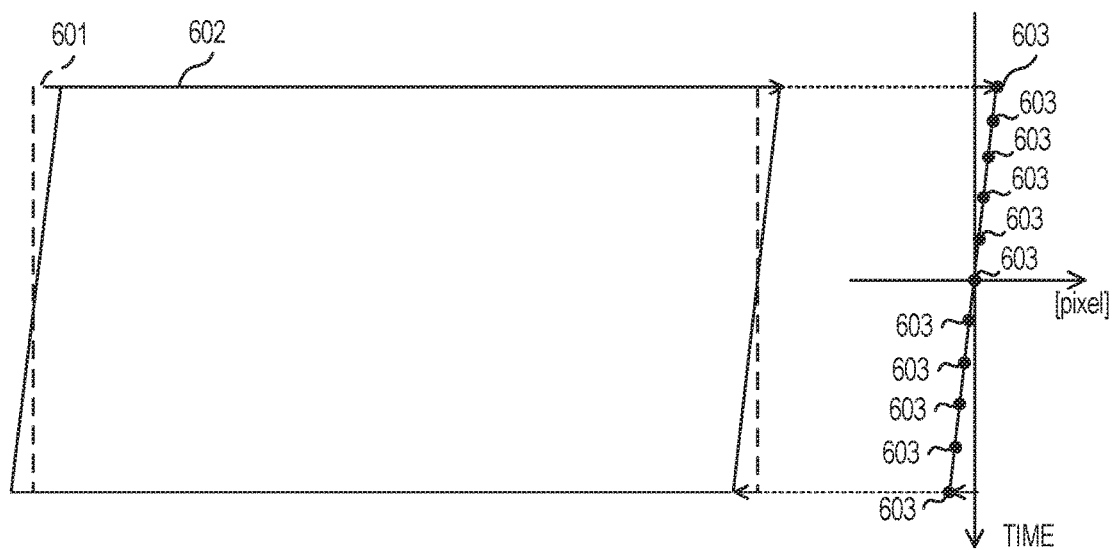
FIG. 6 is a conceptual diagram for illustrating rolling shutter distortion correction.

FIG. 6 is a conceptual diagram for illustrating rolling shutter distortion correction. In FIG. 6, an image 601 represents an image in which rolling shutter distortion has not occurred. An image 602 represents an image in which rolling shutter distortion has occurred due to the image pickup apparatus having been moved in a horizontal direction during the exposure period.

A plurality of data points 603 are data points obtained by calculating, at a plurality of points (in the example illustrated in FIG. 6, 11 points) in the perpendicular direction, the movement amount (shake amount) of the image pickup apparatus in the horizontal direction that occurred during the exposure period. The movement amount of each line may be obtained by interpolating between the plurality of points. Correction is carried out by changing the readout position at each line for the shake in the horizontal direction based on the obtained movement amount as the correction amount.

The shake producing rolling shutter distortion is detected by the shake detection unit 117 in the same manner as in the first embodiment. The camera system control unit 118 and the image blur correction control unit 106 are configured to calculate, based on the detected shake, the correction amount for correcting rolling shutter distortion. The video signal processing unit 111 is configured to perform rolling shutter distortion correction by electronic image blur correction based on the calculated correction amount.

Figure 7:
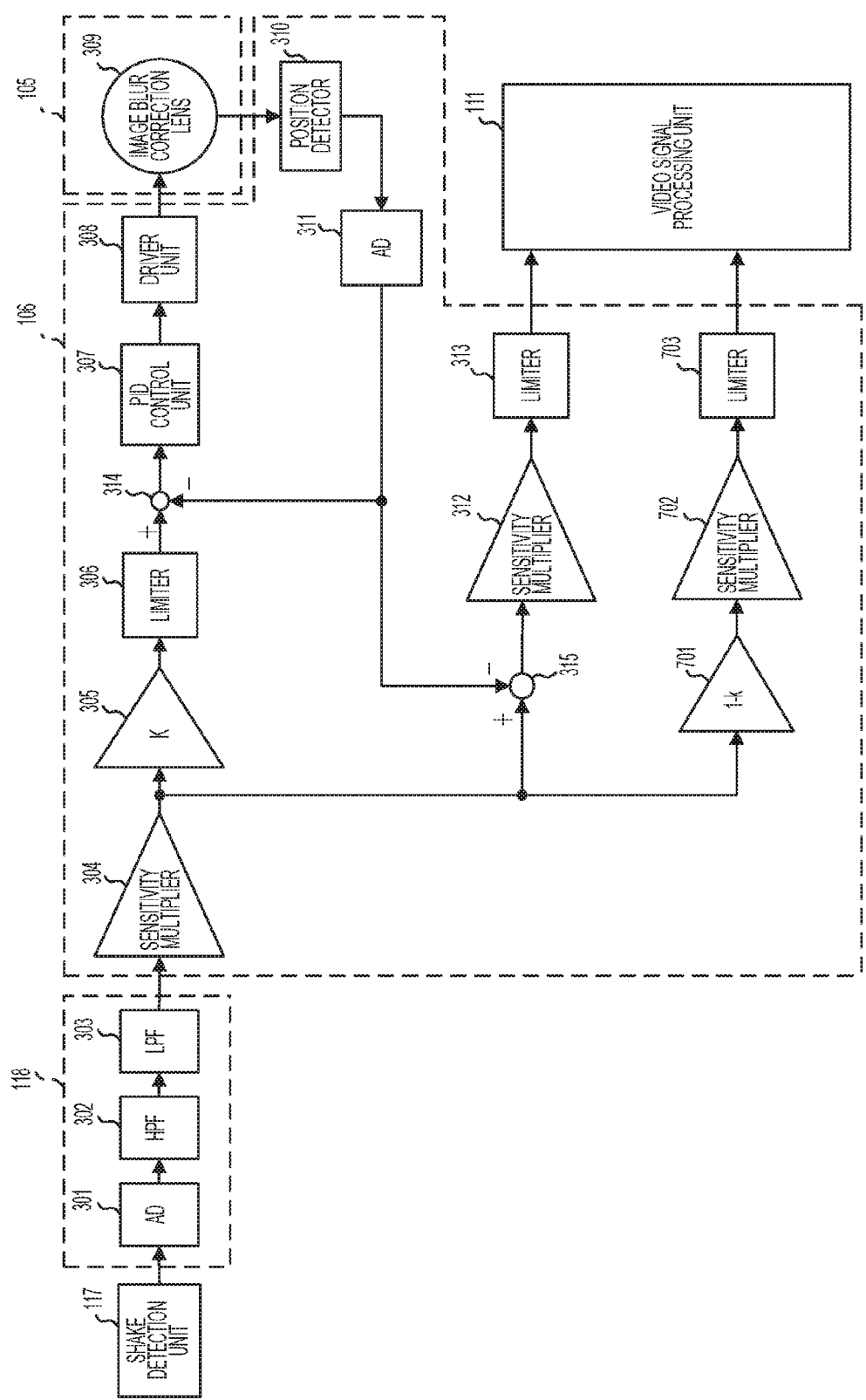
FIG. 7 is a block diagram of an image blur correction control unit according to a second embodiment of the present invention.

The method of calculating the correction amount is described with reference to FIG. 7. FIG. 7 is a block diagram for illustrating the configuration of the image blur correction control unit 106 according to the second embodiment. In FIG. 7, blocks having the same function as in the first embodiment illustrated in FIG. 3 are denoted by the same reference numeral, and a description thereof is sometimes omitted here.

The image blur correction control unit 106 further includes, in addition to the parts in the first embodiment, a correction amount calculating unit 701, a sensitivity multiplier 702, and a correction amount limiter 703. The correction amount calculating unit 701 is configured to multiply the image blur correction amount output from the sensitivity multiplier 304 by a coefficient (1-K) in order to correct rolling shutter distortion.

As described in the first embodiment, the electronic image blur correction amount is calculated by subtracting the value representing the positron of the image blur correction lens 309 detected by the position detector 310. In this embodiment, in addition to this, in order to correct rolling shutter distortion, a value obtained by multiplying the image blur correction amount by the coefficient (1-K) is used for correction. In other words, position information on the image blur correction lens 309 is not used to correct rolling shutter distortion. Adding the coefficient K of optical image blur correction to the coefficient (1-K) of rolling shutter distortion correction gives a value of 1. In other words, the method of calculating the coefficient according to this embodiment can be thought of as a method in which the overall image blur correction amount is divided by the ratio of K:(1-K) for optical image blur correction and rolling shutter distortion correction.

The reason why position information on the image blur correction lens 309 is not used for rolling shutter distortion correction is now described. The reason is that if rolling shutter distortion is corrected by using a value representing the position of the image blur correction lens 309 detected by the position detector 310, the image pickup apparatus is more susceptible to the effects of disturbances caused by high-frequency vibrations.

In contrast to electronic image blur correction, which corrects image blur by a correction amount of one point during the exposure period, rolling shutter distortion correction corrects rolling shutter distortion by interpolating between a plurality of points by using a plurality of points during the exposure period. When the image pickup apparatus is affected by a disturbance caused by high-frequency vibrations, in rolling shutter distortion correction carried out based on a plurality of points, the value representing the position of the image blur correction lens 309 may be affected by noise different at each correction point. As a result, correction error due to the interpolation between the correction points tends to occur. Those effects are more noticeable when the image pickup apparatus is mounted on a tripod or the like.

Consequently, the correction amount of rolling shutter distortion correction not calculated by subtracting the value representing the position of the image blur correction lens 309, but the correction amount of rolling shutter distortion correction is calculated by dividing the correction amounts of optical image blur correction and rolling shutter distortion correction by K:(1-K).

The sensitivity multiplier 702 is configured to convert the input data into a correction pixel amount of rolling shutter distortion correction. The correction amount limiter 703 is configured to clamp the correction amount of rolling shutter distortion correction so as not to exceed the movable range, and output the clamped correction amount to the video signal processing unit 111. The video signal processing unit 111 is configured to perform rolling shutter distortion correction based on the output correction amount.

With rolling shutter distortion correction carried out based on the above-mentioned processing, in addition to the same advantageous effects as those in the first embodiment, correction of rolling shutter distortion can also be carried out. As a result, for example, in an image pickup apparatus employing a rolling shutter method such as a CMOS sensor, an image pickup apparatus capable of taking images having little rolling shutter distortion can be provided.

Other Embodiment

In each of the above-mentioned embodiments, optical image blur correction is carried out by driving the position of the image blur correction lens 309, which is a part of the image blur correction unit 105. However, optical image blur correction may also be carried out by driving the image pickup element of the image pickup unit 109. In this case, the position detector 310 is configured to detect the position of the image pickup element instead of the position of the image blur correction lens 309.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited, to the disclosed exemplary embodiments. The scope of the following claims is to be accorded the broadest interpretation so as to encompass all such modifications and equivalent structures and functions.

This application claims the benefit of Japanese Patent Application No. 2014-259083, filed Dec. 22, 2014, which is hereby incorporated by reference herein in its entirety.

What is claimed is:

1. An image processing apparatus configured to correct image blur by controlling a first image blur correction unit configured to perform correction optically by driving at least one of a part of an optical system and an image pickup element in a direction for correcting blur in an object image formed by the optical system, and a second image blur correction unit configured to perform correction electronically by controlling a readout position of the image pickup element in a direction for correcting blur in the object image, the image processing apparatus comprising:
a first correction amount calculating unit configured to calculate a first image blur correction amount based on a shake signal detected by a shake detection unit configured to detect shake of the image pickup apparatus and output a shake signal;
a second correction amount calculating unit configured to calculate a second image blur correction amount for driving the first image blur correction unit based on the first image blur correction amount; and
a third correction amount calculating unit configured to calculate a third image blur correction amount for driving the second image blur correction unit based on the first image blur correction amount and a value representing a position of the at least one of a part of the optical system and the image pickup element being driven by the first image blur correction unit, the value being detected by a position detector configured to output a value representing the position of the at least one of a part of the optical system and the image pickup element.

2. An image processing apparatus according to claim 1, wherein the third correction amount calculating unit is configured to calculate the third image blur correction amount by subtracting, from the first image blur correction amount, the value representing the position of the at least one of a part of the optical system and the image pickup element detected by the position detector.

3. An image processing apparatus according to claim 1, wherein the image pickup element comprises an element configured to take an image by an exposure method having a different exposure timing at each pixel line, wherein the image processing apparatus is configured to further control a third image blur correction unit configured to perform correction electronically by controlling a readout position of the image pickup element in a direction for correcting distortion of the object image produced by differences in the exposure timing, and
wherein the image processing apparatus further comprises a fourth correction amount calculating unit configured to calculate a fourth image blur correction amount for the third image blur correction unit based on the first image blur correction amount.

4. An image processing apparatus according to claim 3, wherein when a movable range of the first image blur correction unit is represented by A, a movable range of the second image blur correction unit is represented by B, and a coefficient K is calculated by $K=A/(A+B)$, the fourth correction amount calculating unit is configured to calculate the fourth image blur correction amount by multiplying the first image blur correction amount by a coefficient $(1-K)$.

5. An image processing apparatus according to claim 1, wherein when a movable range of the first image blur correction unit is represented by A, a movable range of the second image blur correction unit is represented by B, and a coefficient K is calculated by $K=A/(A+B)$, the second correction amount calculating unit is configured to calculate the second image blur correction amount by multiplying the first image blur correction amount by the coefficient K.

6. An image processing apparatus according to claim 1, wherein the image processing apparatus is configured to further control a mode selection unit capable of selecting any one of a first mode for performing image blur correction only by the first image blur correction unit and a second mode for performing image blur correction by using the first image blur correction unit and the second image blur correction unit together, and
wherein the second correction amount calculating unit is configured to set, when the first mode is selected by the mode selection unit, the second image blur correction amount to the same value as a value for the first image blur correction amount.

7. An image processing apparatus according to claim 1, wherein the second correction amount calculating unit is configured to set, during an exposure period for taking a still image by the image pickup apparatus, the second image blur correction amount to the same value as a value for the first image blur correction amount.

8. An image processing method for correcting image blur by controlling a first image blur correction unit configured to perform correction optically by driving at least one of a part of an optical system and an image pickup element in a direction for correcting blur in an object image formed by the optical system, and a second image blur correction unit configured to perform correction electronically by controlling a readout position of the image pickup element in a direction for correcting blur in the object image, the image processing method comprising:
a first correction amount calculating step of calculating a first image blur correction amount based on a shake signal detected by a shake detection unit configured to detect shake of the image pickup apparatus and output a shake signal;
a second correction amount calculating step of calculating a second image blur correction amount for driving the first image blur correction unit based on the first image blur correction amount; and
a third correction amount calculating step of calculating a third image blur correction amount for driving the second image blur correction unit based on the first image blur correction amount and a value representing a position or the at least one of a part of the optical system and the image pickup element being driven by the first image blur correction unit, the value being detected by a position detector configured to output a value representing the position of the at least one of a part of the optical system and the image pickup element.

* * * * *